United States Patent [19]

Feichtinger

[11] Patent Number: 4,611,156
[45] Date of Patent: Sep. 9, 1986

[54] METHOD AND APPARATUS FOR DETERMINING THE POSITION OR DIMENSIONS OF A TEST OBJECT

[75] Inventor: Kurt Feichtinger, Palling, Fed. Rep. of Germany

[73] Assignee: Dr. Johannes Heidenhain GmbH, Traunreut, Fed. Rep. of Germany

[21] Appl. No.: 658,195

[22] Filed: Oct. 5, 1984

[30] Foreign Application Priority Data

Oct. 11, 1983 [DE] Fed. Rep. of Germany ....... 3336854

[51] Int. Cl.$^4$ ............................................. G05B 19/18
[52] U.S. Cl. ................................... 318/632; 318/569; 364/474; 364/176
[58] Field of Search ............... 318/632, 569, 561, 578, 318/571, 567, 568, 570, 565, 572, 626; 364/474, 176, 475, 513

[56] References Cited

U.S. PATENT DOCUMENTS

| | | | |
|---|---|---|---|
| 3,727,119 | 4/1973 | Stanley | 318/568 |
| 3,911,347 | 10/1975 | Hartary | 318/632 |
| 4,150,327 | 4/1979 | Camera | 318/571 X |
| 4,266,172 | 5/1981 | Yamazaki | 318/571 X |
| 4,296,364 | 10/1981 | Fukuyama | 318/632 X |
| 4,362,978 | 12/1982 | Pollard | 318/632 X |
| 4,382,215 | 5/1983 | Barlow | 364/474 X |
| 4,511,976 | 4/1985 | Graf | 364/474 |

FOREIGN PATENT DOCUMENTS 0029499 10/1980 European Pat. Off. .

Primary Examiner—William M. Shoop, Jr.
Assistant Examiner—Patrick C. Keane
Attorney, Agent, or Firm—Willian Brinks Olds Hofer Gilson & Lione Ltd.

[57] ABSTRACT

An improved apparatus and process for sensing a test object by means of a switching sensor which is movable relative to the test object, in which the relative position between the test object and the switching sensor is measured by a measuring instrument. The switching sensor generates a switching signal at the moment of contact with the test object in order to cause the instantaneously prevailing measuring value of the measuring instrument to be retained. Such measuring values commonly are characterized by sensing errors as a function of the sensing speed and/or the material pairing between the switching sensor and the test object. In order to correct for such sensing errors the measuring value present at the moment of contact between the switching sensor and the test object is added with previously determined correction values for correcting errors resulting from the velocity of approach between the test object and the switching sensor and/or for the material pairing between the switching sensor and the test object.

12 Claims, 3 Drawing Figures

METHOD AND APPARATUS FOR DETERMINING THE POSITION OR DIMENSIONS OF A TEST OBJECT

BACKGROUND OF THE INVENTION

The present invention relates to a method and apparatus for determining the position and dimensions of a test object by means of a measuring system coupled to a switching sensor, wherein the switching sensor is movable relative to the test object with an approach velocity, wherein the measuring instrument generates a measuring signal indicative of the relative position of the switching sensor with respect to the test object, and wherein the switching sensor generates a sensing signal upon contact with the test object.

European Patent Application No. 0 029 499 discloses an arrangement for determining the dimensions of a test object by means of a switching sensor movable relative to the test object. A measuring arrangement is included for measuring the relative position between the test object and the switching sensor. At the moment of contact between the switching sensor and the test object, the switching sensor generates a sensor signal which causes the instantaneously prevailing measuring value of the measuring instrument to be stored.

Typically, during operation the switching sensor approaches the test object with an approach velocity that can vary widely. It has been shown that in systems of the type described above the measured position of the test object is affected by errors caused by deformation of the switching sensor and of the test object at the common contact point between them. Such deformations vary in the first place as a function of the sensing speed or velocity of approach between the switching sensor and the test object and, in the second place, as a function of the materials used for the switching sensor and test object.

SUMMARY OF THE INVENTION

The present invention is directed to an improved apparatus and method for determining the position and dimensions of a test object by eliminating measuring errors of the type described above dependent upon sensing speed and material paring.

According to this invention, a measuring system of the type described above is modified by first storing a set of correction values indicative of previously determined switching sensor errors resulting from at least one of (1) the velocity of approach between the test object and the switching sensor and (2) material characteristics of the switching sensor and the test object. The sensing signal is used to store a value of the measuring signal, and this value of the measuring signal is then corrected with at least a selected one of the correction values in order to reduce errors.

The present invention provides the important advantage that previously determined correction values can be used to provide the desired corrections in a remarkably simple, rapid, and accurate manner. In this way, the measured dimension of the test object can be made substantially independent of the particular sensing speed and the particular material pairing between the switching sensor and the test object. Thus, the position and dimensions of the test object can be measured in a highly efficient manner while avoiding errors of the type described above.

Further advantageous features of the invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
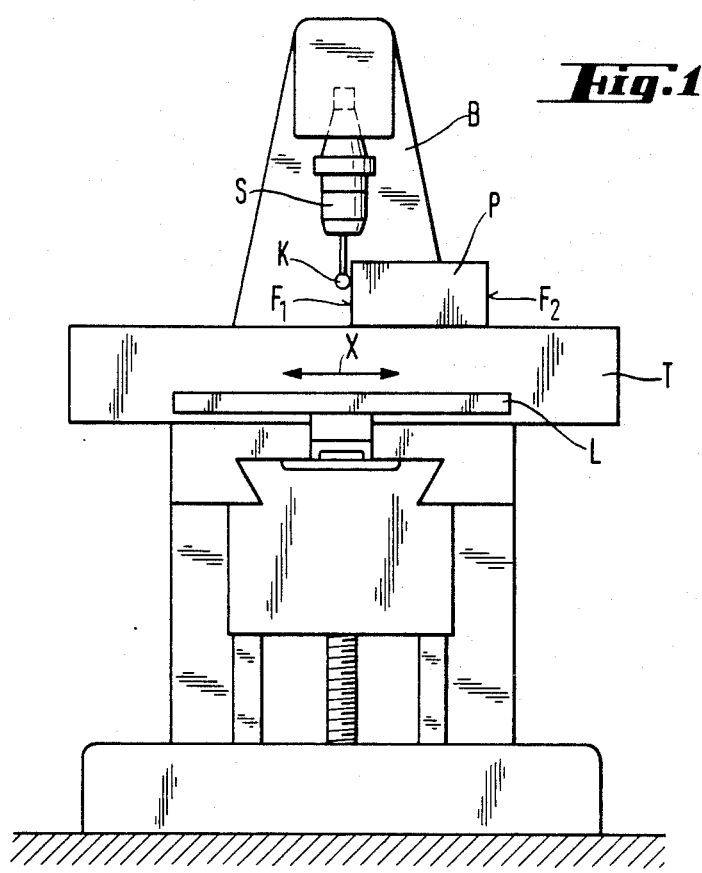
FIG. 1 is a schematic representation of a three axis measuring machine.

Turning now to the drawings, FIG. 1 represents a three axis measuring machine having a table T which serves to support a test object P which is shiftable in three orthogonal machine axes with respect to a machine base B. A length measuring arrangement L is provided on the three axis measuring machine for measuring the displacement of the table T with respect to the test object P in the X direction. For simplicity, only the X direction will be considered in the following discussion, although it should be understood that a similar approach can be used for the Y and Z directions as well. A switching sensor S acting in the three machine axes is secured to the machine base B for the sensing of surfaces $F_1$, $F_2$ of the test object P.

In order to determine the position and/or the outside measurements of the test object P in the X direction, the table T with the test object P arranged on it is shifted in the X direction with a certain prescribed speed until the surface $F_1$, $F_2$ to be measured of the test object P comes into contact with the sensing ball K of the switching sensor S. The position of the table T and thereby of the test object P is measured by the length measuring arrangement L. At the moment of contact between the surface $F_1$ to be sensed of the test object P and the sensing ball K of the switching sensor S, the switching sensor S gives off a signal which causes the measuring value present at this moment in the length measuring arrangement L for the relative position between the test object P and the switching sensor S to be stored. Thereafter in the same manner the surface $F_2$ lying opposite the surface $F_1$ of the test object P is sensed by the switching sensor S. From the two measuring values thereby obtained the position and outside dimension of the test object P in the X direction are determined.

Figure 3:
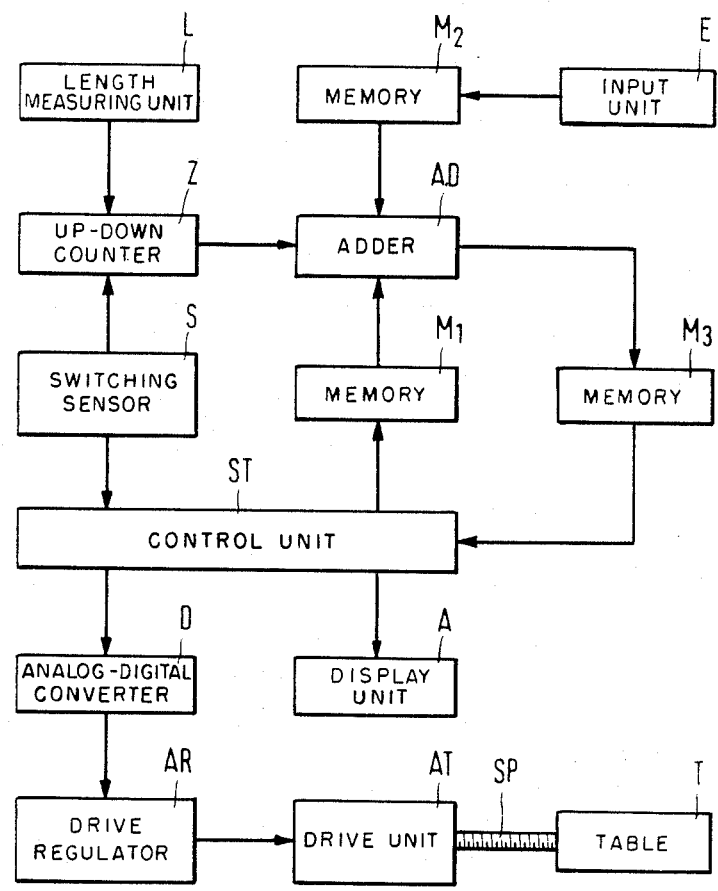
FIG. 3 is a block diagram of a presently preferred embodiment of the apparatus of this invention.

The table T is movable by means of a spindle SP which is rotated by a drive unit AT in order to alter the relative position between the test object P and the switching sensor S. The drive unit AT is controlled by a numerical control arrangement ST via a digital to analog converter D and a drive regulator AR, as shown in FIG. 3. The length measuring arrangement L for measuring the displacement of the test object P with respect to the switching sensor S is coupled to an up-down counter Z which counts with correct sign (plus or minus) measuring impulses generated by the length measuring arrangement L. The switching sensor S generates a switching signal at the moment of contact between the surfaces $F_1$, $F_2$ to be sensed of the test object P and the sensing ball K. This switching signal is applied to the control arrangement ST, and this switching signal causes the up-down counter Z to retain the instantaneously prevailing measuring value and to transfer this measuring value to an adder AD. The control ST responds to the switching signal by halting relative movement between the switching sensor S and the test object P.

Figure 2:
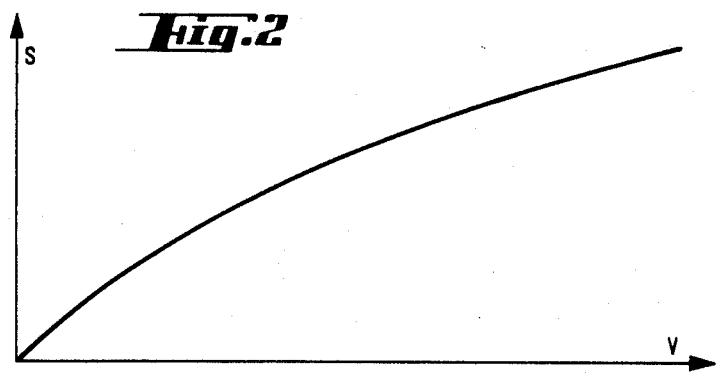
FIG. 2 is a diagram illustrating the shifting of the switching point of the switching sensor as a function of the sensing speed.

FIG. 2 represents a diagram of the displacement S of the switching point of the switching sensor S as a function of the sensing speed V for a predetermined material pairing as a result of deformations between the sensing ball K of the switching sensor S and the test object P at the common point of contact.

According to this invention, switching point displacements S of the type described above in conjunction with FIG. 2 are stored as previously determined correction values as a function of the scanning speed V in the form of a correction table in digital form in a memory $M_1$ which is connected with the adder AD and the control arrangement ST. Similarly, previously determined correction values for the various material pairings are stored in digital form in a memory $M_2$ which is likewise connected with the adder AD as well as to an input unit E. This input unit E operates to select the appropriate correction value for the particular material pairing present in a particular measuring operation from the correction values stored in the memory $M_2$. This selected one of the correction values of memory $M_2$ is applied as an input to the adder AD. The control arrangement ST selects on the basis of the sensing speed V prescribed by it the correction value from the memory $M_1$ appropriate to the particular sensing operation. This selected correction value from the memory $M_1$ is also applied as an input to the adder AD.

The adder AD also receives as an input the measuring value transferred from the counter Z at the moment the switching signal generated by the switching sensor S at the moment of contact is received. The adder AD operates to add this measuring value with the selected correction values from the memories $M_1$, $M_2$ in order to correct for sensing errors resulting from sensing speed and the particular material pairing between the ball K and the test object P. The resulting corrected measuring value is then stored in a memory $M_3$ and can thereupon be displayed by the control arrangement ST in a display unit A. From the two corrected measuring values in the scanning of the surfaces $F_1$, $F_2$, there is obtained the position and outside dimension of the test object P in the X direction.

The adder AD can be formed (in a manner not shown) by a computer included in the control arrangement ST, by which there can also occur a further processing of the corrected measuring values stored in the memory $M_3$.

The correction values can be determined in advance as a function of the particular discreet variable sensing speeds to be used, or alternately the correction values can be allocated in each case to a predetermined range of sensing speeds.

In this specification the term "material pairing" is meant to refer to the material properties of the sensing ball K of the switching sensor S and of the test object P to be sensed in respect to their hardness, i.e., their resistance to mechanical deformation at the common point of contact in the sensing operation.

The velocity dependent error corrected for by means of the memory $M_1$ arises as a function of the velocity of approach between this switching sensor S. This is because after the switching sensor has contacted the test object P, the table T continues to travel a short distance before the presence of the test object P is sensed due to the deformation of the sensor ball K and the test object P. The magnitude of this distance is dependent upon the velocity of approach and is stored in the memory $M_1$ for correction purposes.

The correction values stored in the memory $M_2$ to correct for errors resulting from material pairing of the test object P and the sensing ball K arise due to deformation of at least one of the test object P and the sensing ball K during the sensing process. These correction values are dependent upon the particular material pairing used for the sensing process and are stored in the memory $M_2$.

The velocity dependent errors and the material pairing errors can accumulate. That is, velocity dependent errors and material pairing errors can occur simultaneously and for this reason in the preferred embodiment described above the correction values stored in the memories $M_1$, $M_2$ are superimposed on one another. In alternate embodiments correction values from the memories $M_1$, $M_2$ can be multiplied together rather than added together in order to perform the desired correction.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a process for measuring the position and/or dimensions of a test object with at least a measuring system coupled to a switching sensor, wherein the switching sensor is movable relative to the test object with an approach velocity, wherein the measuring system generates a measuring signal indicative of the relative position of the switching sensor with respect to the test object, and wherein the switching sensor generates a sensing signal upon contact with the test object, the improvement comprising:

storing a set of correction values indicative of previously determined switching sensor errors, said errors resulting from the velocity of approach between the test object and the switching sensor, and the material characteristics of the switching sensor and the test object;

utilizing the sensing signal to store a value of the measuring signal; and correcting the value of the measuring signal with at least a selected one of the correction values to substantially eliminate errors said at least a selected one of the correction values selected in accordance with said at least one of (1) the velocity of approach between the test object and the switching sensor and (2) material characteristics of the switching sensor and the test object.

2. The method of claim 1 wherein the correction values are stored in at least one memory.

3. The method of claim 1 wherein the correction values are determined in advance in accordance with a selected velocity of approach between the test object and the switching sensor.

4. The method of claim 1 wherein the correction values are divided into sets, each allocated to a respective range of velocities of approach between the test object and the switching sensor.

5. The method of claim 1 wherein the correcting step comprises the step of adding the selected one of the correction values to the value of the measuring signal.

6. The method of claim 5 wherein the adding step is performed by a computer included in a control system which controls movement of one of the switching sensor and the test object.

7. The invention of claim 6 wherein the correcting values comprise first correcting values indicative of switching sensor errors resulting from the velocity of approach between the test object and the switching sensor, and stored in a first memory; wherein the correcting values comprise second correcting values indicative of switching sensor errors resulting from material characteristics of the switching sensor and the test object, and stored in a second memory; wherein the control system selects one of the first correcting values from the first memory for use in the correcting step, and wherein an input unit selects one of the second correcting values from the second memory for use in the correcting step.

8. The method of claim 7 wherein the control system selects said one of said first correcting values as a function of the velocity of approach between the test object and the switching sensor.

9. The method of claim 1 further comprising the step of storing the corrected value of the measuring signal.

10. In a measuring apparatus of the type comprising a switching sensor movable relative to a test object with an approach velocity and operative to generate a switching signal upon contact with the test object; and at least a measuring instrument operative to generate a measuring signal indicative of the relative position of the switching sensor with respect to the test object; the improvement comprising:
 a first memory for storing first correction values indicative of switching sensor errors resulting from the velocity of approach between the test object and the switching sensor;
 a second memory for storing second correction values indicative of switching sensor errors resulting from material characteristics of the test object and the switching sensor; and
 an adder coupled to the measuring instrument and the first and second memories for adding a selected one of the first correction values and a selected one of the second correction values to the measuring signal in order to correct for switching sensor errors.

11. The invention of claim 10 further comprising:
 control means for controlling the position of the switching sensor relative to the test object, said control means coupled to the first memory to select the selected one of the first correction values; and
 an input device coupled to the second memory to select the selected one of the second correction values.

12. In a measuring apparatus of the type comprising a switching sensor movable relative to a test object with an approach velocity and operative to generate a switching signal upon contact with the test object; the switching sensor and test object being subject to deformation upon contact with the other and each capable of being comprised of at least one of a plurality of preselected materials; and at least a measuring instrument operative to generate a measuring signal indicative of the relative position of the switching sensor with respect to the test object; the improvement comprising:
 a first memory comprising a table of predetermined first correction values representative of the deformation of the switching sensor and of the deformation of the test object as a function of the approach velocity for a preselected combination of switching sensor material and test object material;
 a second memory comprising a plurality of second correction values representative of the characteristics of the combination of the selected material of the switching sensor and the selected material of the test object; and
 a correction circuit responsive to the switching signal and coupled to the measuring instrument and the first and second memories for applying a correction to the measuring signal based on a selected at least one of the first correction values and a selected at least one of the second correction values to correct for errors in the measuring signal caused by the deformation of the switching sensor and the test object.

* * * * *

UNITED STATES PATENT AND TRADEMARK OFFICE
CERTIFICATE OF CORRECTION

PATENT NO. : 4,611,156

DATED : September 9, 1986

INVENTOR(S) : Kurt Feichtinger

It is certified that error appears in the above-identified patent and that said Letters Patent is hereby corrected as shown below:

On the Title Page:

IN THE REFERENCES CITED
U.S. PATENT DOCUMENTS

In the 3,911,347 10/1975 reference, please delete "Hartary" and substitute therefor --Hartung--.

IN THE DETAILED DESCRIPTION OF THE
PRESENTLY PREFERRED EMBODIMENTS

In column 3, line 67, immediately following "sensor S" please insert --and the test object P--.

IN THE CLAIMS

In Claim 1 (column 4, line 55), after "eliminate" please insert --said--;

In Claim 1 (column 4, line 55), please insert a comma after "errors";

UNITED STATES PATENT AND TRADEMARK OFFICE
CERTIFICATE OF CORRECTION

PATENT NO. : 4,611,156

DATED : September 9, 1986

INVENTOR(S) : Kurt Feichtinger

It is certified that error appears in the above-identified patent and that said Letters Patent is hereby corrected as shown below:

In Claim 1 (column 4, line 57), please delete the word "said".

Signed and Sealed this

Nineteenth Day of April, 1988

Attest:

DONALD J. QUIGG

*Attesting Officer*       *Commissioner of Patents and Trademarks*